United States Patent [19]

Witte

[11] 4,448,480
[45] May 15, 1984

[54] OPTICAL FIBER COUPLER

[75] Inventor: Hans-Hermann Witte, Munich, Fed. Rep. of Germany

[73] Assignee: Siemens Aktiengesellschaft, Berlin & Munich, Fed. Rep. of Germany

[21] Appl. No.: 294,302

[22] Filed: Aug. 19, 1981

[30] Foreign Application Priority Data

Sep. 30, 1980 [DE] Fed. Rep. of Germany ....... 3036883

[51] Int. Cl.$^3$ ............................................... G02B 7/26
[52] U.S. Cl. .............................. 350/96.15; 350/96.21
[58] Field of Search ............... 350/96.15, 96.16, 96.21, 350/96.30, 96.20

[56] References Cited

U.S. PATENT DOCUMENTS

| | | | |
|---|---|---|---|
| 3,646,473 | 2/1972 | Young | 350/96.30 X |
| 4,164,364 | 8/1979 | Witte | 350/96.15 X |
| 4,199,222 | 4/1980 | Ikushima et al. | 350/96.20 X |
| 4,232,938 | 11/1980 | Dabby et al. | 350/96.20 |
| 4,325,604 | 4/1982 | Witte | 350/96.15 |

FOREIGN PATENT DOCUMENTS

| | | | |
|---|---|---|---|
| 2,842,276 | 4/1980 | Fed. Rep. of Germany. | |
| 2910637 | 9/1980 | Fed. Rep. of Germany | 350/96.15 |
| 116254 | 9/1979 | Japan | 350/96.15 |
| 2031609 | 4/1980 | United Kingdom. | |

*Primary Examiner*—John D. Lee
*Attorney, Agent, or Firm*—Hill, Van Santen, Steadman & Simpson

[57] ABSTRACT

A coupler which is used with light conducting system fibers of a fiber optical communication system to couple-out and couple-in a light signal to the system fibers characterized by the coupler having at least three optical coupler fibers for connection to the system fibers and an arrangement for holding the fibers in a plane with two of the fibers converging together to have a portion of each of the fibers adjacent the end face in parallel side by side relationship with the end faces being flush and holding at least the third fiber with its end face abutting against the end faces of the pair of fibers with each of the glass fibers forming the coupler having an overall diameter which is equal to the core diameter of the system fibers which are connected thereto. Preferably, the cladding of each of the coupler fibers is as thin as possible and the coupling fibers may be embedded in a material having an index of refraction which is less than that of the cladding of the fiber to reduce light losses.

10 Claims, 2 Drawing Figures

OPTICAL FIBER COUPLER

BACKGROUND OF THE INVENTION

The present invention relates to a coupler for use with light conducting system fibers of a fiber optical system to couple-out and couple-in light to the system fibers, wherein the coupler has at least three coupler fibers such as optical glass fibers for connection to the system fibers and the coupler fibers are positioned on a support to lie in a plane with two of the coupling fibers extending in side by side coupling relationship with end faces being flush with at least the third coupler fiber with its end face abutting against the end faces of the first and second fibers so that the light in the pair of fibers is coupled into the third fiber and the light entering the coupler in the third fiber can be coupled into the pair of fibers.

Input/output coupling elements which utilize at least three fibers are known and described in the copending U.S. patent application Ser. No. 068,218, filed Aug. 20, 1979 which issued on Apr. 20, 1982 as U.S. Pat. No. 4,325,604 and based on German application P 28 42 276.6. These types of coupling elements or couplers are simple to manufacture and always had low insertion losses for the light signals. Therefore, they are particularly suited for use in optical communications particularly in data buses in which, due to a great distance between subscribers and/or the number of subscribers that are included in the information exchange or network, high path attenuations occur. For use in optical communication systems, glass fibers of the coupler or coupling elements are connected to the system fibers of the optical communication systems.

SUMMARY OF THE INVENTION

The present invention is directed to further reducing coupling losses which occur at the coupler when used in an optical communication system.

This object is achieved in an improvement in a coupler for coupling light into and out of light conducting system fibers of a fiber optical communication system, said coupler comprising at least first, second and third coupler fibers, which are glass optical fibers and are connectable to the system fibers, and means for holding said coupler fibers in a plane with the first and second coupling fibers converging together to have a portion of each of said fibers adjacent an end face extending in parallel side by side relationship with the end faces being flush and said means for holding positioning at least the third fiber with its end face abutting against the end faces of the first and second fibers. The improvement is that the overall diameter of each of the coupler fibers of the coupler is equal to the core diameter of the system fibers which are to be connected to the coupler fibers of the coupler. Thus, at the transition or junction of the incoming glass fibers to the outgoing glass fibers of the coupler, there is only the loss which results from an error in alignment of the coupler fibers at the coupling location. This loss is purely a geometric condition on account of the error in the alignment of the glass coupler fibers in the coupler because the fiber end faces of the incoming coupler fibers are not completely covered by the fiber end faces of the outgoing fiber couplers.

An important embodiment of the present invention is that the cladding of each of the coupler fibers of the coupler is as thin as possible whereby the fluctuation in the cladding thickness of these coupler fibers is permitted on the order of magnitude of 100%.

In the coupling between the coupler fibers of the coupler and the system fibers theoretically no loss occurs any longer in the case of the cladding of the coupler fiber which is as thin as possible. In the inventive dimensioning of the coupler fiber, light is partially coupled from the core of the system fiber into the cladding of the coupler and is guided therein. However, the fraction of this light depends upon the cladding thickness of the coupler fiber. Since the length of the coupler fiber of the coupler is minimal the loss of the light guided in the cladding is correspondingly small. This is particularly true if the glass coupler fibers are embedded in an optical cement which exhibits a low index of refraction. Since the light guided in the cladding will only undergo a small percentage loss and since a double low loss is still a low loss, fluctuation in a cladding thickness of the glass coupler fibers of the coupler in the order of magnitude of 100% are permitted and tolerated. With these tolerances, the manufacturing technology required for producing the glass fibers with the thin cladding are greatly reduced.

More important than the fact that the cladding of each of the glass coupler fibers of the coupler is as uniformly thin as possible, is the demand that the glass coupler fibers of the coupler be embedded in an optical cement, which is applied on the glass fibers as homogeneously as possible. This is necessary in order to achieve an ideal as possible reflection at the interface or boundary surface between the cladding and the cement. If, during the application of the cement on the coupler fibers of the coupler, air bubbles are formed on the interface of the fiber cladding and cement, a scattering center will be produced. More light will be lost at this scattering center at the interface of the cladding and cement than is lost due to the case of fluctuation of the cladding thickness of the coupler fibers in the order of 100% deviation.

In an advantageous embodiment of the invention, the claddings of each of the glass coupler fibers of the coupler are embedded in an agent or material whose index of refraction is lower than the index of refraction for the cladding of the coupler fiber. In this manner, the overall losses of the coupler are further reduced. An agent particularly suitable for use as the material with the low index of refraction is the optical cement. Likewise, air and/or cover substrate material may be utilized. If the materials used for embedding have the same coefficient of thermal expansion as the coupler fibers and the rest of the material of the coupler, then possible stresses which are caused by different rates of thermal expansion and which cause interference or defects in the coupler, are avoided.

DESCRIPTION OF THE PREFERRED EMBODIMENTS

Figure 1:
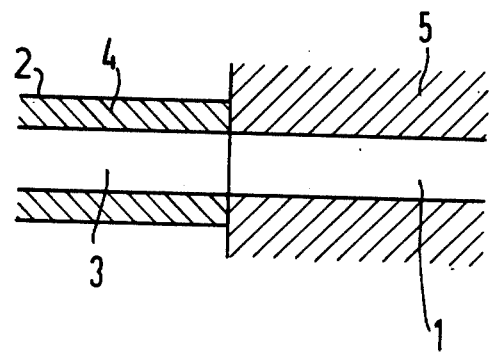
FIG. 1 is a cross-sectional view with portions in elevation for purposes of illustration of a connection between a coupler fiber of a coupler to a system fiber of a fiber optical communication system taken along the fiber axes.

The present invention is particularly useful in a coupler having a coupler fiber 1 which is connected to a system fiber 2. As illustrated in FIG. 1, the system fiber 2 has a core 3 with a cladding 4. The cladding of the coupler fiber 1, which fiber is a glass fiber, is not illustrated due to the fact of its small thickness.

The cladding thickness of the glass coupler fiber 1 amounts to less than 5 $\mu$ so that the fluctuations on the order of the magnitude of 100% are permitted and tolerated. The overall diameter of the glass fiber 1 is equal to the diameter of the core 3 of the system fiber 2. The glass coupler fiber 1 is embedded in a medium or material 5, which has an index of refraction that is lower than the index of refraction of the cladding for the glass coupler fiber 1.

Figure 2:
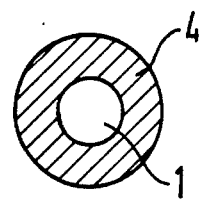
FIG. 2 is a cross-sectional view of the coupling location between the coupler fiber and a system fiber taken in the direction extending towards the system fiber.

The coupler location between the glass fiber 1 and the system fiber 2 is illustrated in FIG. 2. It can be clearly seen that the overall diameter of the glass coupler fiber 1 coincides with the core diameter of the core 3 of the system fiber 2. Since the viewing direction of the cross-sectional view proceeds away from the glass fiber 1 towards the fiber 2, the embedding material or medium 5 is not illustrated.

The structure of the coupler and the method of manufacturing the coupler are disclosed in greater detail in my copending U.S. patent application, Ser. No. 068,218, which was filed Aug. 20, 1979 and was based on German patent application P-28 42 276.6. The disclosure of this copending application is hereby incorporated by reference thereto.

The claddings of the glass fiber 1 of the coupler as mentioned hereinabove is to be as thin as possible. Such optical fibers can be manufactured from any of the following methods. One of these methods is to deposit the cladding on an optical fiber core. This can be accomplished by a chemical vapor deposition (CVD) method with external depositions which method will deposit and subsequently form a cladding of a homogeneous material of a desired thickness on the core of the fiber.

A second possible method is to provide a fiber having a cladding and then to chemically etch the cladding of the fiber to the desired thickness. Another method involves a chemical vapor deposition method (CVD) with internal deposition of material with a gradient index profile to form a preform. The preform is subsequently collapsed and ground to the desired cladding thickness prior to being drawn into the fiber.

If the coupling fiber is to have a stepped profile type fiber with a thin cladding, it can be easily manufactured by utilizing a double crucible method. The size of the opening in the crucible for the cladding or jacket of the fiber will be adjusted to provide the desired thickness for the cladding.

Although various minor modifications may be suggested by those versed in the art, it should be understood that I wish to embody within the scope of the patent granted hereon, all such modifications as reasonably and properly come within the scope of my contribution to the art.

I claim:

1. A coupler for coupling light signals into and out of light conducting system fibers of a fiber optical system to couple-out and couple-in a light signal to the system fibers, said coupler comprising at least first, second and third optical coupler fibers for connection to the system fibers, and means for holding said coupler fibers in a plane with the first and second coupler fibers converging together to have a portion of each of said coupler fibers adjacent the end faces extending in parallel side by side relationship with the end faces being flush and said means for holding positioning at least the third coupler fiber with its end face abutting against the end faces of the first and second coupler fibers with the improvement comprising that each of the coupler fibers having an overall diameter equal to the core diameter of the system fiber which is being connected thereto.

2. In a coupler according to claim 1, wherein the materials utilized in constructing the parts of the coupler have approximately the same coefficient of thermal expansion so that the stresses caused by different rates of expansion are not present in the coupler.

3. In a coupler according to claim 1, wherein each of the coupler fibers of the coupler are embedded in a material having an index of refraction which is lower than the index of refraction of a cladding of the coupler fiber.

4. In a coupler according to claim 3, wherein each of the materials utilized in constructing the parts of the coupler have approximately the same coefficient of thermal expansion so that stresses created by different coefficients of thermal expansion are not present in the coupler.

5. In a coupler according to claim 3, wherein the material is an optical cement.

6. In a coupler according to claim 1, wherein each of the coupler fibers has a cladding which is thin as possible whereby fluctuations in the cladding thickness of the coupler fiber in the order of magnitude of 100% are tolerated.

7. In a coupler according to claim 6, wherein the materials utilized for constructing the parts of the coupler have approximately the same coefficient of thermal expansion so that the stresses created by different coefficients of thermal expansion are not present in said coupler.

8. In a coupler according to claim 6, wherein each of the coupler fibers is embedded in material having an index of refraction which is lower than the index of refraction of the cladding.

9. In a coupler according to claim 8, wherein the materials utilized for constructing the parts of the coupler have approximately the same coefficient of thermal expansion so that the stresses which are created due to different coefficients of thermal expansion are not present in the coupler.

10. In a coupler according to claim 8, wherein the material is an optical cement.

* * * * *